(12) United States Patent
Colosimo

(10) Patent No.: US 11,015,037 B2
(45) Date of Patent: May 25, 2021

(54) GRAPHENE MANUFACTURE

(71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 440 days.

(21) Appl. No.: 15/509,390

(22) PCT Filed: Sep. 22, 2015

(86) PCT No.: PCT/GB2015/052721
§ 371 (c)(1),
(2) Date: Mar. 7, 2017

(87) PCT Pub. No.: WO2016/046529
PCT Pub. Date: Mar. 31, 2016

(65) Prior Publication Data
US 2017/0275170 A1  Sep. 28, 2017

(30) Foreign Application Priority Data

Sep. 22, 2014  (GB) ..................... 1416692

(51) Int. Cl.
| | | |
|---|---|---|
| *B32B 9/00* | (2006.01) | |
| *C08K 3/04* | (2006.01) | |
| *C01B 32/184* | (2017.01) | |
| *C01B 32/186* | (2017.01) | |
| *B82Y 30/00* | (2011.01) | |

(52) U.S. Cl.
CPC ............ *C08K 3/042* (2017.05); *C01B 32/184* (2017.08); *C01B 32/186* (2017.08); *B82Y 30/00* (2013.01); *C01B 2204/02* (2013.01); *C01B 2204/32* (2013.01); *Y10T 428/30* (2015.01)

(58) Field of Classification Search
CPC ........ B82Y 30/00; Y10T 428/30; C01B 31/04
USPC .......................... 428/408; 427/29.1; 423/448
See application file for complete search history.

(56) References Cited

U.S. PATENT DOCUMENTS

| | | | |
|---|---|---|---|
| 3,131,049 A | 4/1964 | Miccioli | |
| 2010/0218801 A1* | 9/2010 | Sung ...................... | B82Y 30/00 136/244 |
| 2012/0082787 A1* | 4/2012 | Fujita ..................... | B82Y 30/00 427/228 |
| 2012/0241690 A1 | 9/2012 | Janowska | |

(Continued)

FOREIGN PATENT DOCUMENTS

| | | |
|---|---|---|
| CN | 102583359 A | 7/2012 |
| CN | 103241733 A | 8/2013 |

(Continued)

OTHER PUBLICATIONS

Great Britain Search Report of Patent Application No. GB1416692.3 dated Jun. 3, 2015, 4 pages.

(Continued)

*Primary Examiner* — Daniel H Miller
(74) *Attorney, Agent, or Firm* — Maine Cernota & Rardin

(57) ABSTRACT

A method of manufacturing a graphene sheet comprising the steps of: providing a container containing liquid and a volume above the liquid; supplying carbon atoms to the volume; and allowing carbon atoms to settle on the surface of the liquid and to coalesce to form the graphene sheet.

20 Claims, 5 Drawing Sheets

(56) References Cited

U.S. PATENT DOCUMENTS

Figure 1A:
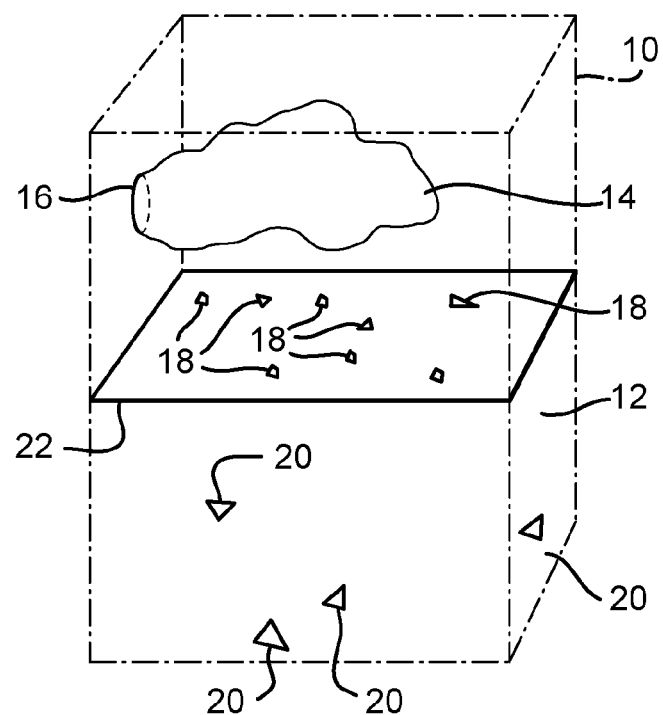

| | | | |
|---|---|---|---|
| 2012/0258311 A1* | 10/2012 | Hong | B82Y 30/00 |
| | | | 428/408 |
| 2014/0212596 A1 | 7/2014 | Jahangiri-Famenini | |
| 2016/0347618 A1* | 12/2016 | Carlson | B01J 27/232 |

FOREIGN PATENT DOCUMENTS

| | | |
|---|---|---|
| JP | S62277147 A | 12/1987 |
| WO | 2013149417 A1 | 10/2013 |
| WO | 2015150791 A1 | 10/2015 |

OTHER PUBLICATIONS

International Search Report and Written Opinion of Application No. PCT/GB2015/052721, dated Dec. 10, 2015, 15 pages.
Mengqi Zeng et al: "Liquid Metal: An Innovative Solution to Uniform Graphene Films", Chemistry of Materials, vol. 26, No. 12, May 22, 2014 (May 22, 2014), pp. 3637-3643, XP055234146, US ISSN: 0897-4756, DOI: 10.021/cm501571h p. 3638.
International Search Report and Written Opinion of Application No. PCT/GB2015/052721, dated Mar. 28, 2017, 10 pages.
Ding et al; "Chemical Vapor deposition of graphene on liquid metal catalysts"; Carbon, vol. 53, Mar. 2013, pp. 321-326.

* cited by examiner

GRAPHENE MANUFACTURE

RELATED APPLICATIONS

This application is a National Phase application filed under 35 USC § 371 of PCT Application No. PCT/GB2015/052721 with an International filing date of Sep. 22, 2015, which claims priority of GB Patent Application GB1416692.0 filed Sep. 22, 2014. Each of these applications is herein incorporated by reference in its entirety for all purposes.

The present invention relates to a method of manufacturing graphene, with particular, but by no new exclusive, reference to the manufacture of large, continuous sheets of graphene.

Graphene is material comprised of carbon just one atom thick. Graphene is tougher than diamond, and possesses many remarkable and desirable properties. For example, graphene has high thermal conductivity, electrical conductivity and a high strength to weight ratio. Graphene also exhibits remarkable optical properties. Its potential uses are many and are still being discovered. It can be used in flexible touchscreens for mobiles, super-light batteries, aerospace composite materials and medical uses. However, manufacturing methods only allow for small chips or platelets of graphene to be created. These often measure less than a few millimetres. It is evident that larger sheets of graphene will be needed to fulfill the potential applications of graphene. This is a difficult task, because two dimensional graphene is of higher energy than three dimensional structures. Additionally, phonon density of states increases with increasing physical size, which acts to force crystals into a three dimensional configuration.

According to a first aspect of the invention there is provided a method of manufacturing a graphene sheet.

providing a container containing a liquid and a volume above the liquid;

supplying carbon atoms to the volume; and allowing carbon atoms to settle on the surface of the liquid and to coalesce to form the graphene sheet.

The invention is not limited in terms of the size of the graphene sheet manufactured. In fact, the present invention seeks to provide a method of manufacturing large sheets of graphene, up to metres in length and/or width.

The carbon atoms may coalesce to form a plurality of graphene fragments on the surface of the liquid. The graphene fragments may be allowed to coalesce to form the graphene sheet.

The step of supplying the carbon atoms may comprise creating the carbon atoms by photolysis, by electrical discharge, decomposition, cracking or fracking. Creation of the carbon atoms by photolysis may comprise the photodissociation of a suitable precursor using electromagnetic radiation of a suitable wavelength or wavelengths. The wavelength used may be in the ultraviolet region of the electromagnetic spectrum, or of a shorter wavelength. In principle, a multi-photon dissociation mechanism might be utilised. Creation of the carbon atoms by electrical discharge may be achieved through electrical arcing. The electrical arcing may take place between rods of carbon.

Typically, the step of supplying the carbon atoms comprises creating the carbon atoms in the container. It may be possible to create the carbon atoms outside of the container and to introduce the carbon atoms into the container. In general, this is less preferred owing to the high reactivity of carbon atoms.

The container may comprise at least one source of localised carbon atoms. The source of localised carbon atoms may be moved within the container to control the distribution of carbon atoms on the surface of the liquid. A directional source of localised carbon atoms, such as a source which produces an output beam of carbon atoms, may be used.

The carbon atoms may be created using a carbon containing precursor gas, such as a hydrocarbon gas. The hydrocarbon gas may be an alkane, such as methane or ethane. Alternatively, the carbon containing precursor gas may be a per or partially halogenated hydrocarbon. The term "gas" as used herein is understood to refer to any species in the gas phase, including vapours and sublimates.

The carbon atoms may be created using particulate graphite as a precursor.

The carbon atoms may be created using a carbohydrate precursor. A sugar precursor, such as sucrose, may be used. The sugar precursor may be decomposed to produce the carbon atoms.

The settling can be effected by one of more of gravity, condensation, interatomic forces, such as van der Waals forces, between the liquid and the carbon atoms, the presence of a gaseous atmosphere in the volume above the liquid, and control of the conditions in the container such as temperature and pressure. In general, the method is performed to control the density of carbon atoms. In general, a sufficiently low volume density of carbon atoms and a sufficiently large interatomic distance is required so that carbon atoms do not interact before reaching the surface of the liquid, and so that stacking of carbon atoms does not occur. However, in general it is also desirable to use as high a volume density of carbon atoms as possible within these constraints so that reaction rates are increased.

The liquid may be agitated to allow the carbon atoms and/or the graphene fragments to coalesce. The liquid may be agitated mechanically. Mechanical agitation can be performed with a stirrer such as a magnetic stirrer. Alternatively, the liquid may be agitated by ultrasound.

The liquid may be any suitable liquid which allows carbon atoms to settle and the graphene to float on its surface either through surface tension, repulsive forces and/or through temporary bond formation between the liquid and the carbon atoms. The liquid is held at a predetermined temperature and pressure to allow the graphene to form and to float. This enables the nascent graphene to retain its two dimensional structure, overcoming any tendency for the structure to fold up. The liquid is held in the container which can be heated and/or pressurised to ensure the correct conditions for graphene formation. The liquid may be water, an acid, a base, another polar liquid or an organic liquid such as a hydrocarbon.

The volume above the liquid may be held at a desired vacuum (dependent on the partial pressure of the liquid).

The volume above the liquid may contain a gaseous atmosphere at a desired pressure. The gaseous atmosphere may be held at a desired temperature. The gaseous atmosphere may comprise an inert gas such as a Noble gas, for example, argon or helium.

The graphene sheet is formed on the surface of the liquid which allows planar movement of the carbon atoms and/or graphene fragments. The planar movement can be random and will be at the correct temperature and pressure to allow bonds between carbon atoms to be formed. As mentioned previously, it may be desirable to agitate the surface of the liquid to increase the likelihood of the carbon atoms bonding with each other. The agitation can be effected by any suitable means such as an ultrasonic device or a swirling mechanism such as a magnetic stirrer.

The method may comprise the further step of removing the graphene sheet from the container. This can be achieved by any suitable means. The graphene sheet may be removed by firstly draining the liquid from the container and secondly collecting the graphene sheet. A liquid-porous substrate may be located within the liquid. The liquid-porous substrate may act as a support for the graphene sheet once the liquid has drained through the liquid-porous substrate. The liquid-porous substrate may be removable from the container.

Alternatively, the graphene sheet may be removed from the surface of the liquid by a device. The graphene sheet may be removed by a roller device. The graphene sheet may be rolled up onto the roller device. The device may be a skimming device. A further possibility is to evaporate the liquid and to subsequently move the graphene sheet from the container.

According to a second aspect of the invention there is provided apparatus for manufacturing a graphene sheet comprising:

a container containing a liquid and a volume above the liquid; and a carbon atom source for supplying carbon atoms to the volume so that the carbon atoms can settle on the surface of the liquid;

wherein the apparatus is configured to allow the carbon atoms to coalesce to form the graphene sheet.

The apparatus may further comprise an agitator for agitating the liquid.

According to a third aspect of the invention there is provided a graphene sheet manufactured in accordance with the first aspect of the invention.

Whilst the invention has been described above, it extends to any inventive combination of the features described above, or in the following description, claims and drawings.

Figure 2A:
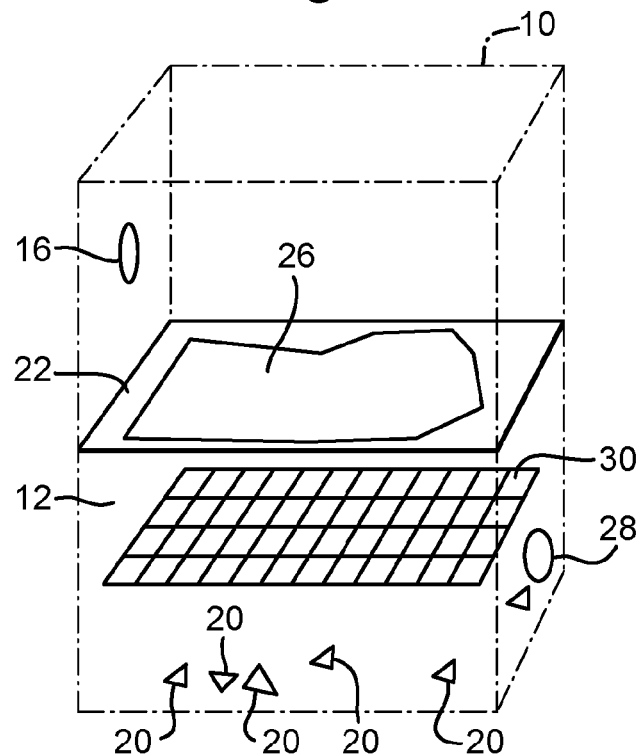
Figure 3A:
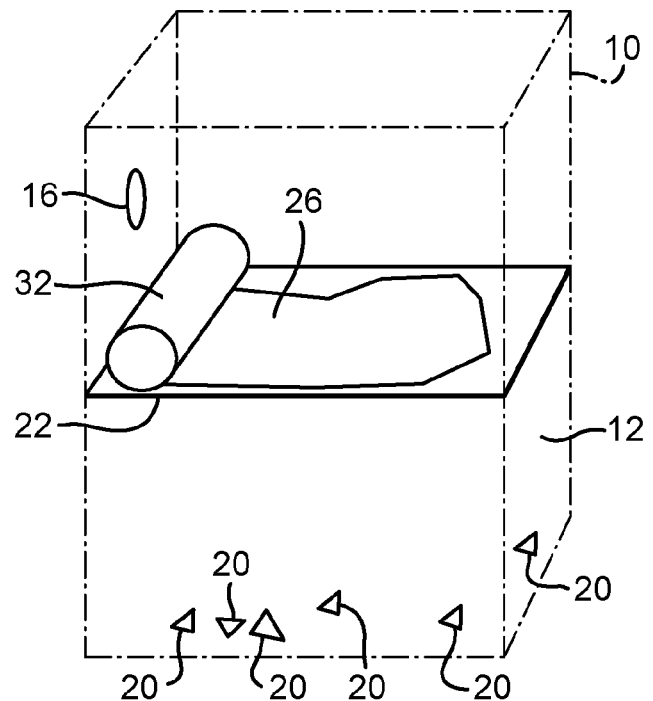
Figure 4A:
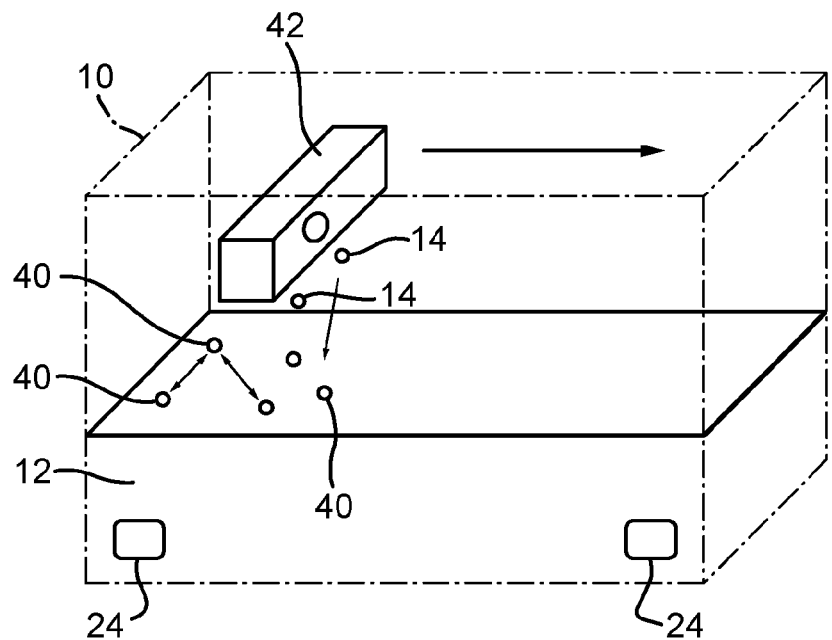

The present invention will now be described with reference to the accompanying drawings in which:

FIGS. 1(a) and (b) show a first embodiment for forming a graphene sheet;

FIGS. 2(a) and (b) show a method of separating a graphene sheet from a liquid;

FIGS. 3(a) and (b) show an alternative method of separating graphene from a liquid; and FIGS. 4(a), (b) and (c) show a second embodiment for forming a graphene sheet.

Figure 1B:
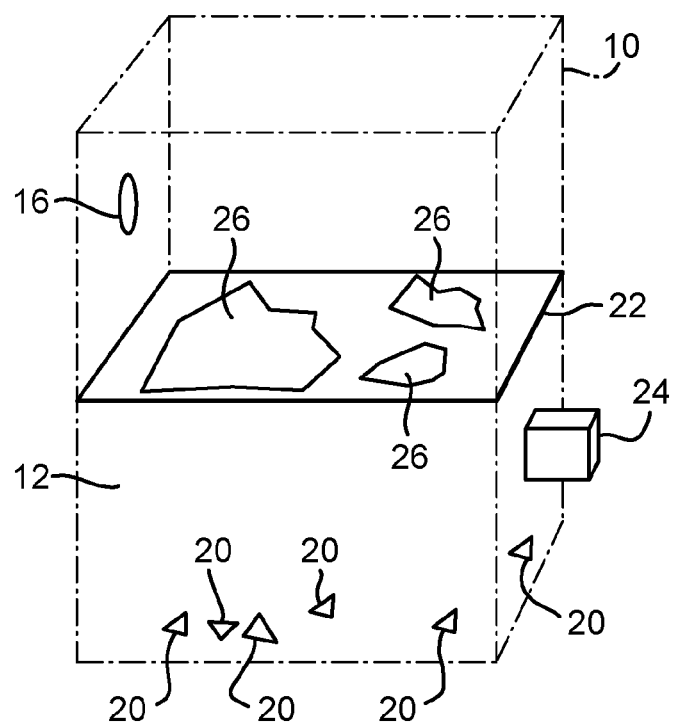

FIG. 1(a) shows a container 10 containing a liquid 12. The container 10 may be heated and/or pressurised to ensure the liquid is at the optimum temperature and pressure to allow the formation of graphene sheets. A source of carbon atoms 14 is created in the volume of the container 10 above the liquid 12. The carbon atoms may be created from a precursor which is introduced through a port 16. Carbon atoms from the source 14 settle on the surface of the liquid 12 to form liquid-carbon bonds. Subsequently, carbon-carbon bonding results in the deposition of graphene fragments 18. Carbon-carbon bonding can occur through random motion of the carbon atoms on the liquid surface and/or deliberate agitation of the liquid. Any unwanted materials 20 may sink below the surface 22 of the liquid so they are not included as part of the graphene sheet. Alternatively, the liquid may dissolve by-product species. FIG. 1(b) shows the container 10 having an agitator 24 which agitates the liquid 12 to encourage graphene formation. The agitator may be an ultrasound device or a mechanical device which causes swirling of the liquid. The graphene assembles into sheets 26. The surface of the liquid acts to retain the two dimensional structure of the graphene sheet.

FIG. 2(a) shows a method of separating the graphene sheet 26 from the liquid 12. The container 10 has a drain port 28 through which the liquid 12 is drained.

Figure 2B:
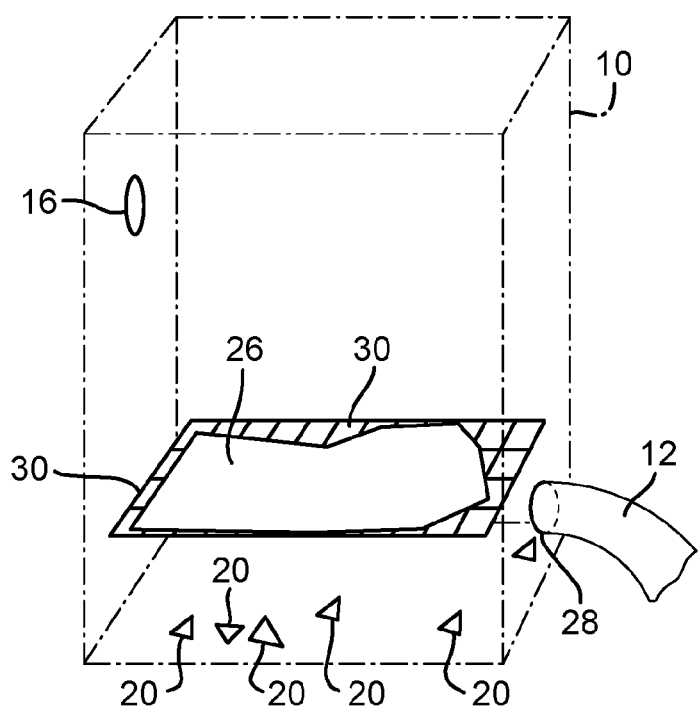

The container has a liquid-porous substrate 30 located within it and which is located in the liquid 12. FIG. 2(b) shows the liquid being drained through the drain port 28. As the liquid level within the container drops so does the graphene sheet 26 until it comes to rest on the liquid-porous substrate 30. The liquid-porous substrate 30 can then be removed from the container 10 and the graphene sheet 26 can be removed from the liquid-porous substrate 30 by any suitable method.

Figure 3B:
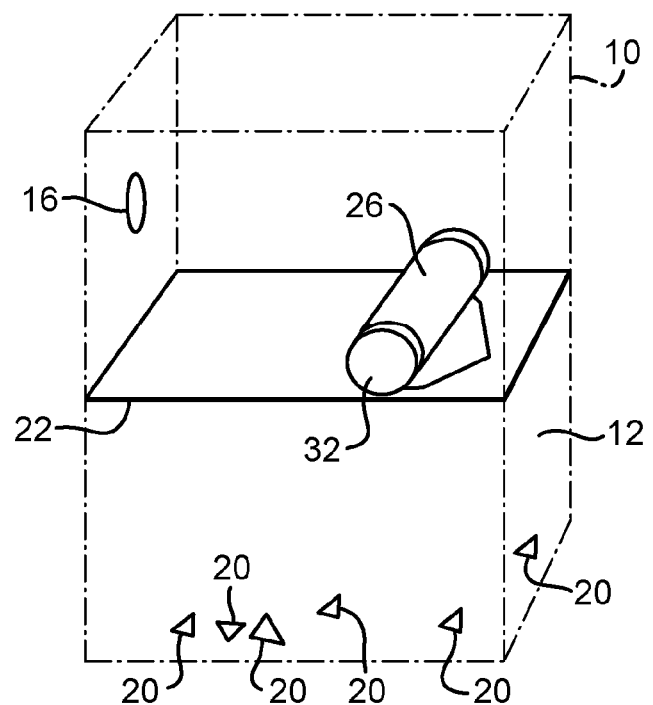

FIG. 3(a) shows an alternative method of removing a graphene sheet 26 from a container 10. A roller 32 is introduced into the container after the graphene sheet 26 has been formed. The roller 32 is then rotated about its central axis over the surface of the graphene sheet 26 so that the graphene sheet 26 is wrapped around the roller 32 as is shown in FIG. 3(b). The roller can then be removed from the container and the graphene sheet can be removed from the roller. The roller can be supported by any suitable means to allow rotation of the roller so that it can roll over the surface of the graphene sheet 26. If the size of the graphene sheet is such that the graphene layer would be wrapped around the roller more than once, then a weakly binding substrate could be used to avoid adjacent layers of graphene binding to each other.

Figure 4B:
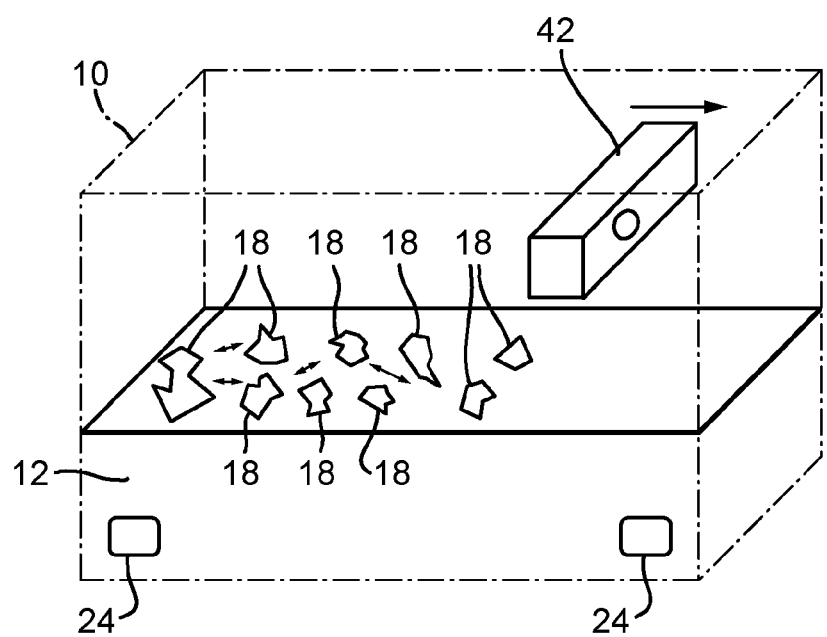
Figure 4C:
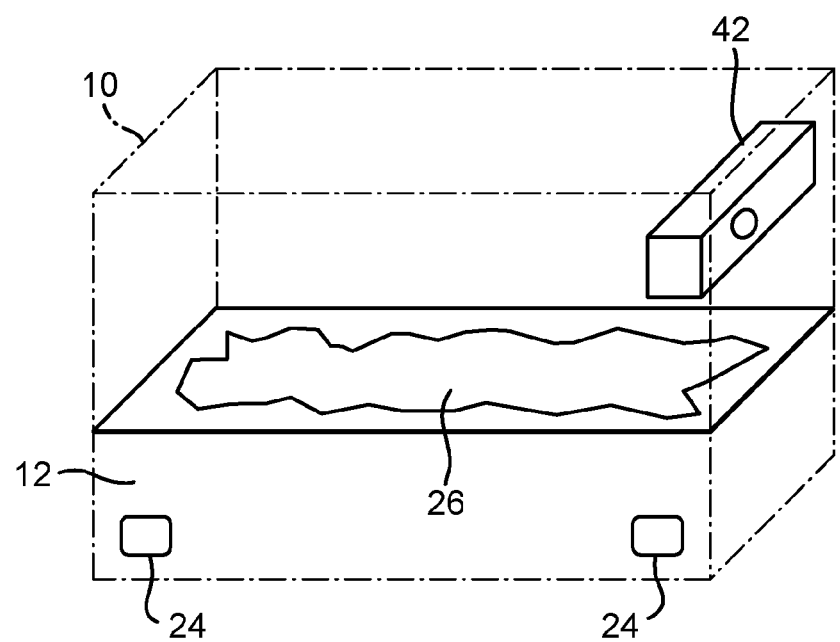

FIG. 4 shows an alternative embodiment of manufacturing a graphene sheet using the container 10 containing liquid 12. In this embodiment, the container 10 comprises a translating source of atomic carbon which is configured to be translatable across the container 10 from a position on the left hand side as shown in FIG. 4(a) to a position on the right hand side as shown in FIG. 4(b). The source of the atomic carbon 42 produces carbon atoms 44 which settle onto the surface of the liquid 12. The settled carbon atoms as shown in FIG. 4(a) are denoted by the numeral 40. The flow of the carbon atoms 44 from the source of the atomic carbon 42 may be to some extent directional. The movement of the source of atomic carbon 42 across the container 10 allows the production of a relatively even distribution of carbon atoms 40 on the surface of the liquid 12. The carbon atoms 40 coalesce to form a plurality of graphene fragments 18. Suitable agitation of the liquid by the agitator 24 may enhance this process. The essentially planar nature of the surface of the liquid 12 encourages the formation and retention of a two dimensional structure. The graphene fragments 18 can be regarded as discrete floating islands. Continuing agitation by an agitator 24 results in the graphene fragments 18 moving and bonding with other graphene fragments 18 to eventually form a large graphene sheet 26 on the surface of the liquid 12. The graphene sheet 26 can then be separated from the liquid 12, for example using the techniques described in relation to FIGS. 2 and 3.

The formation of the graphene sheet may be monitored in-situ by a suitable technique. For example, reflected high-energy electron diffraction (RHEED) or an optical technique, such as reflectometry, ellipsometry, reflectance anisotropy or Raman scattering, might be used.

Variants, modifications, additions and omissions relating to the description above are possible within the ambit of the invention and will be readily apparent to the skilled addressee.

What is claimed is:

1. A method of manufacturing a graphene sheet comprising the steps of:
   providing a sealed container containing a liquid; and a volume above the liquid;
   providing a liquid-porous substrate located within the liquid;
   providing at least one source of localized carbon atoms;
   supplying carbon atoms to the volume above the liquid using the at least one source of localized carbon atoms;
   agitating the liquid to encourage the carbon atoms and/or graphene fragments to coalesce;
   allowing carbon atoms to settle on the surface of the liquid and to coalesce to form the graphene sheet;
   ceasing agitation of the liquid; and
   removing the graphene sheet from the container firstly by draining the liquid from the container and secondly collecting the graphene sheet,
   wherein the liquid-porous substrate is porous to the liquid,
   wherein the liquid-porous substrate is located within the liquid,
   wherein the liquid-porous substrate is configured to allow the liquid to pass through a top side thereof and drain from the container,
   wherein the liquid-porous substrate is configured to act as a support for the graphene sheet once the liquid has drained through the liquid-porous substrate,
   wherein the liquid-porous substrate is configured for non-destructive removal from the container, and
   wherein the liquid is selected from a group that allows carbon atoms to settle and graphene to float on its surface either through surface tension, repulsive forces and/or through temporary bond formation between the liquid and the carbon atoms.

2. The method according to claim 1 in which the carbon atoms coalesce to form a plurality of graphene fragments on the surface of the liquid, and the graphene fragments are allowed to coalesce to form the graphene sheet.

3. The method according to claim 1 in which the step of supplying carbon atoms comprises creating the carbon atoms by photolysis, electrical discharge, decomposition, cracking or fracking.

4. The method according to claim 1 in which the step of supplying the carbon atoms comprises creating the carbon atoms in the container.

5. The method according to claim 1 wherein the at least one source of localized carbon atoms is movable within the container, allowing control over the distribution of carbon atoms on the surface of the liquid.

6. The method according to claim 1 wherein the carbon atoms are created using a carbon containing precursor gas, such as a hydrocarbon gas.

7. The method according to claim 1 wherein the carbon atoms are created using particulate graphite as a precursor.

8. The method according to claim 1 wherein the settling is effected by one or more of gravity, condensation, interatomic forces, the presence of a gaseous atmosphere in the volume above the liquid, and control of the conditions in the container such as temperature and pressure.

9. The method according to claim 1 in which the liquid is agitated mechanically or by ultrasound.

10. The method according to claim 1 in which the volume above the liquid contains a gaseous atmosphere at a desired pressure.

11. The method according to claim 1 in which the graphene sheet is removed from the substrate of the liquid by a device.

12. The method according to claim 11 wherein the graphene sheet is removed by a roller device.

13. Apparatus for manufacturing a graphene sheet comprising:
    a sealed container containing a liquid and a volume above the liquid;
    a localized carbon atom source for supplying carbon atoms to the volume above the liquid so that the carbon atoms can settle on the surface of the liquid;
    an agitator configured to agitate the liquid; and
    a liquid-porous substrate disposed within the liquid,
    wherein the at least one source of localized carbon atoms is movable within the container, allowing control over the distribution of carbon atoms on the surface of the liquid,
    wherein the liquid-porous substrate is porous to the liquid,
    wherein the liquid-porous substrate is located within the liquid,
    wherein the liquid-porous substrate is configured to allow the liquid to pass through a top side thereof and drain from the container
    wherein the liquid-porous substrate is configured to act as a support for the graphene sheet once the liquid has drained through the liquid-porous substrate,
    wherein the liquid-porous substrate is removable from the container,
    wherein the liquid is selected from a group that allows carbon atoms to settle and graphene to float on its surface either through surface tension, repulsive forces and/or through temporary bond formation between the liquid and the carbon atoms,
    wherein the apparatus is configured to allow the carbon atoms to coalesce to form the graphene sheet, and
    wherein the agitator is configured to agitate the liquid while the graphene sheet is coalescing.

14. The apparatus for manufacturing a graphene sheet of claim 13 wherein the agitator is configured to cease agitating the liquid prior to removal of a graphene sheet therefrom.

15. The method according to claim 1 wherein the liquid is selected from the group of liquids consisting of water, acids, bases, polar liquids, organic solvents, and hydrocarbons.

16. The method according to claim 1 wherein the liquid is an organic solvent.

17. The method according to claim 1 wherein the liquid is water.

18. The method according to claim 1 wherein the liquid of a type that dissolves by-product species.

19. The apparatus of claim 13 wherein the liquid is an organic solvent.

20. The apparatus of claim 13 wherein the liquid of a type that dissolves by-product species.

* * * * *